(12) United States Patent
Karapantelakis et al.

(10) Patent No.: US 11,368,898 B2
(45) Date of Patent: Jun. 21, 2022

(54) REGULATION OF COMMUNICATION TERMINAL ACCESS TO A COMMUNICATION NETWORK

(71) Applicant: Telefonaktiebolaget LM Ericsson (publ), Stockholm (SE)

(72) Inventors: Athanasios Karapantelakis, Solna (SE); Rohit Shukla, Noida (IN); Nipun Sharma, New Delhi (IN); Venkata Sameer Kumar Kodukula, Noida (IN); Aditya Kumar Sinha, New Delhi (IN); Praveen Arora, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 16/770,779

(22) PCT Filed: Dec. 14, 2017

(86) PCT No.: PCT/SE2017/051275
§ 371 (c)(1),
(2) Date: Jun. 8, 2020

(87) PCT Pub. No.: WO2019/117773
PCT Pub. Date: Jun. 20, 2019

(65) Prior Publication Data
US 2021/0076300 A1 Mar. 11, 2021

(51) Int. Cl.
*H04W 48/02* (2009.01)
*H04W 28/02* (2009.01)
*H04L 67/12* (2022.01)

(52) U.S. Cl.
CPC ....... *H04W 48/02* (2013.01); *H04W 28/0231* (2013.01); *H04L 67/12* (2013.01)

(58) Field of Classification Search
CPC ............. H04W 48/02; H04W 28/0231; H04W 12/122; H04W 12/088; H04W 4/70;
(Continued)

(56) References Cited

U.S. PATENT DOCUMENTS

| 5,978,669 A | 11/1999 | Sanmugam |
| 2004/0162070 A1* | 8/2004 | Baral ............... H04W 12/12 455/551 |

(Continued)

FOREIGN PATENT DOCUMENTS

| CN | 101959192 A | 1/2011 |
| CN | 103828476 A | 5/2014 |

(Continued)

OTHER PUBLICATIONS

Afolabi, Ibrahim, et al. "Network slicing and softwarization: A survey on principles, enabling technologies, and solutions." IEEE Communications Surveys & Tutorials 20.3 (2018): 2429-2453. (Year: 2018).*

(Continued)

*Primary Examiner* — Sharad Rampuria
(74) *Attorney, Agent, or Firm* — Sage Patent Group (57) ABSTRACT

An access regulating device (22) for a communication terminal (10) using a communication network (12) obtains an indication (I) that the communication terminal (10) is a potentially compromised communication terminal, analyses the indication (I), selects type of communication restriction based on the analysis, where a first type of communication restriction comprises barring the communication terminal (10) from using the communication network (12) and a second type of communication restriction comprises limiting the use of the communication network (12) by the communication terminal (10), and informs (B1,B2; Q) at least one network node (16, 18; 24) responsible for handling (Continued)

communication restrictions of the type selected for the communication terminal (10) in order for the communication network (12) to effectuate the communication restriction.

18 Claims, 6 Drawing Sheets

(58) Field of Classification Search
CPC ..... H04W 72/04; H04W 72/12; H04W 76/00; H04L 67/12; H04L 63/1441; H04B 7/2121; H04B 7/2123; H04J 2203/0069; H04Q 2213/394
See application file for complete search history.

(56) References Cited

U.S. PATENT DOCUMENTS

| 2010/0057485 | A1* | 3/2010 | Luft ................ H04W 12/12 455/411 |
| 2015/0032887 | A1  | 1/2015 | Pesek et al. |
| 2017/0188232 | A1  | 6/2017 | Raleigh et al. |
| 2019/0272690 | A1* | 9/2019 | Kaye ................ G07C 9/00571 |

FOREIGN PATENT DOCUMENTS

| WO | 2008109866 A2 | 9/2008 |
| WO | 2011006450 A1 | 1/2011 |
| WO | 2014017117 A1 | 1/2014 |
| WO | 2016099839 A1 | 6/2016 |

OTHER PUBLICATIONS

Bull, Peter, et al. "Flow based security for IoT devices using an SDN gateway." 2016 IEEE 4th international conference on future internet of things and cloud (FiCloud). IEEE, 2016. (Year: 2016).*

First Chinese Office Action for Chinese Patent Application No. CN 201780097730.X dated Sep. 24, 2021, 10 pages (including English translation).

PCT International Search Report and Written Opinion dated Nov. 16, 2018 for International Application PCT/SE2017/051275, 9 pages.

Extended European Search Report for European Patent Application No. 17934606.9 dated May 20, 2021, 12 pages.

3GPP, Technical Specification Group Services and System Aspects, "System Improvements for Machine-Type Communications", (Release 10), 3GPP TR 23.888 V0.3.1, Mar. 5, 2010, Valbonne, France, XP050401912, 33 pages.

3GPP, Technical Specification Group Services and System Aspects, "Feasibility Study on Control of Applications When Third Party Servers Encounter Difficulties", (Release 14), 3GPP TR22.818 V1.2.0, Apr. 20, 2015, Valbonne, France, XP050960766, 25 pages.

* cited by examiner

REGULATION OF COMMUNICATION TERMINAL ACCESS TO A COMMUNICATION NETWORK

CROSS-REFERENCE TO RELATED APPLICATIONS

This application is a 35 U.S.C. § 371 national stage application for International Application No. PCT/SE2017/051275, entitled "REGULATION OF COMMUNICATION TERMINAL ACCESS TO A COMMUNICATION NETWORK", filed on Dec. 14, 2017, the disclosures and contents of which are hereby incorporated by reference in their entireties.

TECHNICAL FIELD

The invention relates to communication networks. More particularly, the invention relates to an access regulating device for a communication terminal using a communication network, an access regulating device, method, computer program and computer program product for regulating access of a communication terminal to a communication network, a communication network comprising an access regulating device, a communication system comprising a host and a method implemented in the communication system.

BACKGROUND

Machine-to-machine (M2M) communication has recently become more and more important in various communication networks, such as mobile communication networks. M2M communication is sometimes also referred to as Internet of Things (IOT). This communication is typically performed between a communication terminal and an application, which may be an application in an external network, i.e. in a network that is external to the communication network. The communication terminal is often denoted User Equipment (UE) or mobile station (MS) when the communication network is a mobile communication network, such as a Home Public Land Mobile Network (HPLMN) communicating according to a 3GPP standard. The above described application is often denoted a machine-type communication (MTC) application.

At the same time, hacking of communication terminals such as mobile stations, has become a problem.

For a communication system that is a mobile communication system with a connection terminal that is a UE, the end-to-end communications, between an MTC Application in the UE and the MTC application in the external network, uses services provided by the mobile communication network and services provided by a Services Capability Server (SCS). Different models of communication are foreseen by the MTC traffic between the Application Server and the UE. One of the models is that of a Hybrid model where the Application Server connects to the mobile communication network for direct plane communication with the UE along with SCS.

The SCS is an entity which connects to the 3GPP network to communicate with UEs used for MTC and/or Services Capabilities Exposure Function (SCEF). The SCS offers capabilities for use by one or multiple MTC Applications. A UE can host one or multiple MTC Applications. The corresponding MTC Applications in the external network are hosted on one or multiple ASs.

The SCEF is the key entity within the 3GPP architecture for service capability exposure that provides a means to securely expose the services and capabilities provided by 3GPP network interfaces, see for instance 3GPP TS 23.682.

When the SCEF belongs to a trusted business partner of the HPLMN, it is still seen as an HPLMN entity by other HPLMN or Visited PLMN (VPLMN) functional entities invoked by the SCEF (e.g. Home Subscription Server (HSS), Mobility Management Entity (MME)). Applications operating in the trust domain may require only a subset of functionalities (e.g. authentication, authorization, etc.) provided by the SCEF.

To enable massive IoT expansion, operators will need to embrace the Low Power Wide Area (LPWA) technologies, such as, narrowband IoT (NB-IoT), Long Term Evolution (LTE) Cat-M1/M2. IoT devices require small data transfers, and 3GPP has determined that delivery via the control plane is much preferred over using the data plane.

In Release 13, 3GPP has proposed that SCEF be used for Non Internet Protocol (IP) Data Delivery (NIDD), as the preferred mechanism for small amounts of data to be transferred between IoT devices and Application Servers. 3GPP has made NIDD a requirement for small data transfers.

MTC communication over LTE-M comprises of multi devices which are connected to the 3GPP LTE-MTC network through a UE (e.g. a gateway). This end user device is a part of the LTE-MTC core network (including Radio Access Network (RAN)) which is used for industrial MTC based communication. This includes smart devices which send small chunks of data at regular intervals over the LTE core network and is monitored by Services Capabilities Enablement Function Server and an Application Server which administers the overall MTC application.

In the short-term future, there is going to be multimillion devices which will be part of M2M/IOT world across different verticals including smart grids, healthcare, connected vehicles, etc. This will lead to more security threats, new & complex areas which needs to be identified and solved.

In this environment there exists a possibility that some M2M devices are/will be compromised, for instance through being hacked.

There is thus a need for handling a potentially compromised communication terminal in a communication network.

SUMMARY

One object of the invention is to handle a potentially comprised communication terminal in a communication network.

This object is according to a first aspect achieved by an access regulating device for a communication terminal that uses a communication network. The access regulating device comprises processing circuitry. The processing circuitry obtains an indication that the communication terminal is a potentially compromised communication terminal, analyses the indication, selects type of communication restriction based on the analysis and informs at least one network node responsible for handling communication restrictions of the type that was selected for the communication terminal. The communication network can then effectuate the communication restriction.

The communication restriction types comprise a first type of communication restriction involving barring the communication terminal from using the communication network and a second type of communication restriction involving limiting the use of the communication network by the communication terminal.

This object is according to a second aspect also achieved by a method for regulating access of a communication terminal to a communication network. The communication network comprises at least one network node responsible for handling communication restrictions. The method is performed in an access regulating device and comprises obtaining an indication that the communication terminal is a potentially compromised communication terminal, analysing the indication, selecting type of communication restriction based on the analysis and informing at least one network node responsible for handling communication restrictions of the type that was selected for the communication terminal. The communication network can then effectuate the communication restriction.

Also according to this second aspect the communication restriction types comprise the above-mentioned first and second types of communication restriction.

The object is according to a third aspect achieved through a computer program for regulating access of a communication terminal to a communication network. The computer program comprises computer program code. When the code is being run in an access regulating device, it causes the access regulating device to obtain an indication that the communication terminal is a potentially compromised communication terminal, to analyse the indication, to select type of communication restriction based on the analysis and to inform at least one network node responsible for handling communication restrictions of the type that was selected for the communication terminal. The communication network can then effectuate the communication restriction.

Also according to this third aspect the communication restriction types comprise the above-mentioned first and second types of communication restriction.

The object is according to a fourth aspect achieved through a computer program product for regulating access of a communication terminal to a communication network. The computer program product comprises a data carrier with computer program code according to the third aspect.

The object is furthermore according to a fifth aspect achieved through an access regulating device for regulating access of a communication terminal to a communication network. The access regulating device comprises means for obtaining an indication that the communication terminal is a potentially compromised communication terminal, means for analysing the indication, means for selecting type of communication restriction based on the analysis and means for informing at least one network node responsible for handling communication restrictions of the type that was selected for the communication terminal. Thereby the communication network is able to effectuate the communication restriction Also in this fifth aspect there is a first and a second type of communication restriction, where. the first type comprises barring the communication terminal from using the communication network and the second type comprises limiting the use of the communication network by the communication terminal.

The object is according to a sixth aspect achieved by a communication network comprising an access regulating device and at least one node responsible for handling communication restrictions. The access regulating device comprises processing circuitry. The processing circuitry obtains an indication of a potentially compromised communication terminal being connected to the communication network, analyses the indication, selects type of communication restriction based on the analysis and informs at least one network node responsible for handling communication restrictions of the type that was selected for the communication terminal. The network node is then configured to implement the restriction.

Also in this case the first type of communication restriction comprises barring the communication terminal from using the communication network and the second type of communication restriction comprises limiting the use of the communication network by the communication terminal.

The above-mentioned object is according to a seventh aspect achieved through a communication system including a host computer, at least one node responsible for handling communication restrictions and an access regulating device. In this case the host computer provides user data and forwards the user data to a communication network for transmission to a communication terminal.

The access regulating device in turn comprises processing circuitry. The processing circuitry obtains an indication that the communication terminal is a potentially compromised communication terminal, analyses the indication, selects type of communication restriction based on the analysis and informs at least one network node responsible for handling communication restrictions of the type selected for the communication terminal. The network node can then effectuate the restriction.

A first type of communication restriction comprises barring the communication terminal from using the communication network and a second type of communication restriction comprises limiting the use of the communication network by the communication terminal.

The object is according to an eighth aspect achieved through a method implemented in a communication system including a host computer, a communication terminal, an access regulating device and at least one node responsible for handling communication restrictions in a communication network. The communication network comprises the access regulating device and the at least one node responsible for handling communication restrictions. The method, which is performed at the host computer, comprises providing user data, and initiating a transmission carrying the user data to the communication terminal via the communication network. The access regulating device in turn obtains an indication that the communication terminal is a potentially compromised communication terminal, analyses the indication, selects type of communication restriction based on the analysis and informs a network node responsible for handling communication restrictions of the type selected for the communication terminal.

The network node can then effectuate the restriction, where a first type of communication restriction comprises barring the communication terminal from using the communication network and a second type of communication restriction comprises limiting the use of the communication network by the communication terminal.

The indication may with advantage be obtained from an application server with which the communication terminal communicates.

The communication terminal may also be involved in machine-to-machine communication with the application server, for instance using narrowband Internet-of-Things communication.

The communication network may be a mobile communication network, such as a fifth generation mobile communication network. When the communication network is a fifth generation mobile communication network the access regulating device may be a network exposure function node.

The access regulating device may be provided through at least apart of a server in a data centre.

One network node responsible for handling the first type of communication restriction may be a rights administration node, such as a home subscriber server. Another network node responsible for handling the first type of communication restriction may be a traffic handling node, such as a mobility management entity or a base station. One node responsible for the second type of communication restriction may be a policy rules setting node, such as a policy and charging rules function node.

The limiting of use may comprise limiting the use to a low-priority tunnel in the communication network.

In an advantageous variation of the first and second aspects, the communication terminal uses a first assigned bearer before the determination of communication restriction and the limiting of use comprises selecting a bearer with lower priority than the first assigned bearer. The bearers may as an example be evolved packet system bearers.

In another variation of the first and second aspects, the limiting of use comprises limiting the communication bandwidth assigned to the communication terminal.

In a further variation of the first and second aspects the indication comprises a confidence setting and the analysis comprises analysing the confidence setting. In this case the selecting of a type of communication restriction is performed if the confidence setting exceeds a confidence threshold.

In yet another variation of the first and second aspects, the indication comprises a time of determining that the communication terminal is potentially compromised and the analysing comprises investigating the time of determining. In this case the first type of restriction is selected if the time of determining is older than an age threshold and the second type of restriction is selected if the time of determining is younger than the age threshold.

According to the first and second aspects, the selecting of type of communication restriction may be based on policy rules provided for the communication terminal. These rules may furthermore be provided in a policy rules setting node of the communication network. However, they may also be provided in the application server or in the access regulating device itself.

According to the first and second aspects, the determining of the communication restriction may also be based on previous determinations of communication restrictions as well as on the duration and type of irregular behaviour of the communication terminal.

In another variation of the first aspect, the processing circuitry is configured to obtain a further indication of a potential compromise. It is also configured to perform a re-evaluation of the determined restriction based on the further indication.

In a corresponding variation of the second aspect, the method comprises obtaining a further indication of a potential compromise and performing a re-evaluation of the determined restriction based on the further indication.

The invention according to the above-mentioned aspects has a number of advantages. It allows limiting of access of a potentially compromised communication terminal. Thereby unwanted and potentially harmful data is avoided from being transferred and possible congestion in the communication network avoided.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 1:
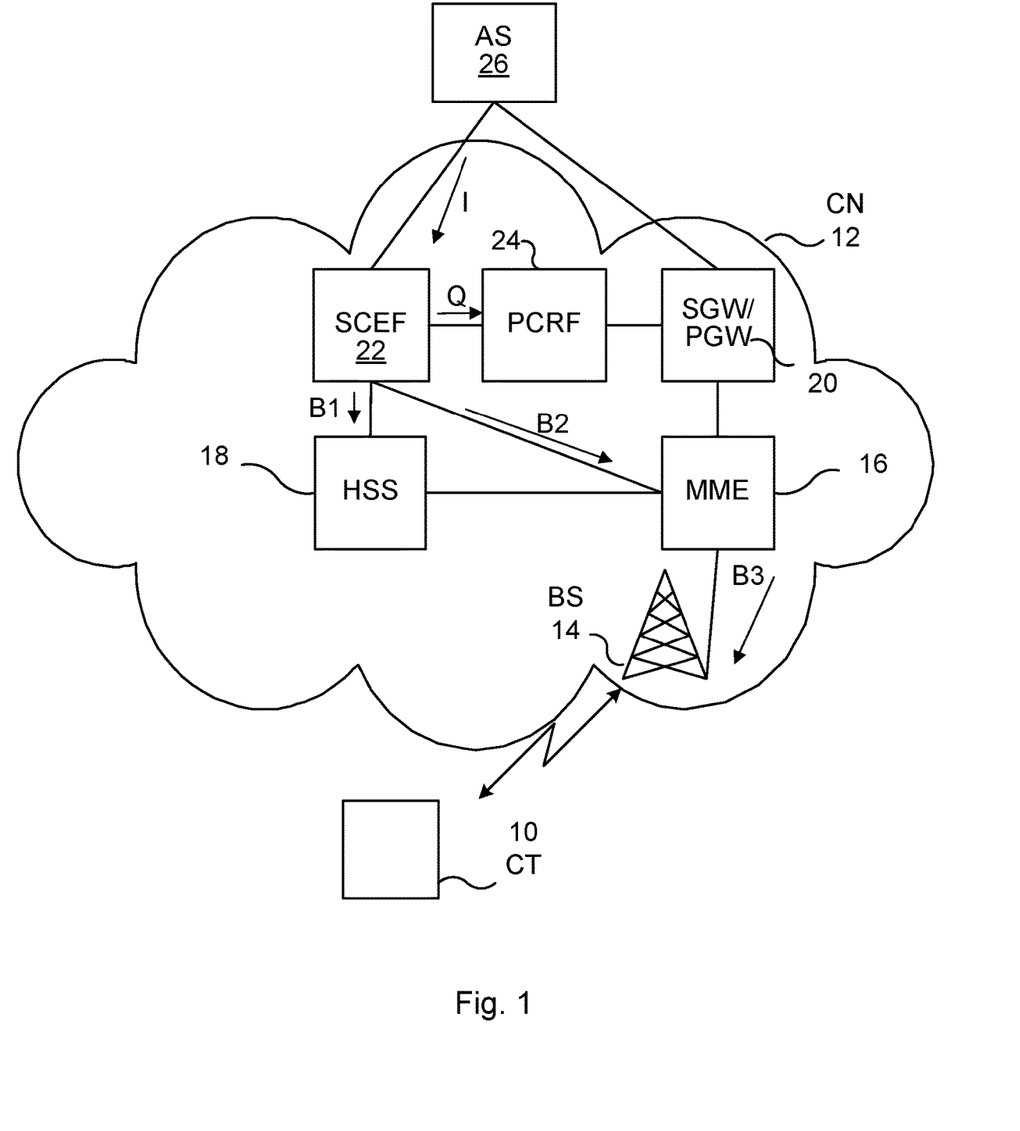
FIG. 1 schematically shows a communication terminal and an application server connected to a communication network as well as various nodes in the communication network.

FIG. 1 schematically shows a communication network CN 12, which in the present example is a telecommunication network. Furthermore, the communication network 12 is in this case a mobile communication network comprising a base station BS 14 connected to a traffic handling node, in the form of a Mobility Management Entity (MME) node 16. The MME node 16 is in turn connected to an SGW/PGW node 20, where SGW is an acronym for Serving Gateway and PGW is an acronym for PDN Gateway, where in turn PDN is an acronym for Packet Data Network. The MME 16 is also connected to a rights administration node, which in this example is a Home Subscriber Server (HSS) 18, as well as to an access regulating device. The access regulating device 22 is in this case a node in the network and more particularly a Services Capability Server (SCS) providing a Service Capability Exposure Function (SCEF). This node and its functionality is described in more detail in 3GPP TS 23.682. It may here be mentioned that the access regulating device may in fact be external to the communication network but cooperating closely with the nodes in it. It may as an example be provided as an external cloud service (e.g. as part of an automated network management solution). The SGW/PGW 20 as well as the access regulating device 22 are also both connected to a policy rules setting node, which in this case is a Policy and Charging Rules Function (PCRF) node 24. The MME, HSS and PCRF are all examples of network nodes responsible for handling communication restrictions.

There is also a communication terminal CT 10 that communicates with the network via the base station 14. The communication terminal may be a machine that performs machine-to-machine (M2M) communication with an application server (AS) 26 and for this reason the SGW/PGW node 20 is connected to the application server 26. For reasons that will become evident later on also the access regulating device 22 is connected to the application server 26. Finally it can be seen that the application server 26 sends a signal I to the access regulating device 22, which in turn sends a signal B1 to the rights administration node 18a signal B2 to the MME 16 and a signal Q to the policy rules setting node 24. The MME is shows sending a signal B3 to the base station 14 and the policy rules setting node 24 is shows as sending a response R to the access regulating device 22.

It should here be realized that the above described connections may be effectuated using TCP/IP communication. It should also be realized that the communication terminal may be communicating with the communication network using for instance narrowband-Internet of Things (NB-IoT) and Non Internet Protocol (IP) data Delivery (NIDD).

The mobile communication network 12 may furthermore be a network allowing Internet connectivity such as a third generation network like Universal Mobile Telecommunications Service (UMTS), a fourth generation network like Long Term Evolution (LTE), or a fifth generation network like 5G.

Aspects of the invention will in the following be described in relation to the communication network 12 when it is a mobile communication network, for instance LTE. However, the invention is not limited to being applied in a mobile communication network, but may for instance be applied in a Public Switched Telecommunication Network (PSTN) or any other type of communication network such as a computer communication network. The PCRF node 24 is a node designated in real-time to determine policy rules in a multimedia network. The PCRF 24 may be a software component that operates at the network core and accesses subscriber databases and other specialized functions, such as a charging system, in a centralized manner. The PCRF 24 is the part of the network architecture that aggregates information to and from the network, operational support systems, and other sources (such as portals) in real time, supporting the creation of rules and then automatically making policy decisions for each communication terminal active on the network 12. Thereby the network 12 might offer multiple services, quality of service (QoS) levels.

The base station 14, which is often termed eNodeB or just NodeB, is furthermore provided in a part of the mobile communication network 12 termed access network or radio access network (RAN), while the other nodes are provided in a part of the mobile communication network 12 termed a core network.

Figure 2:
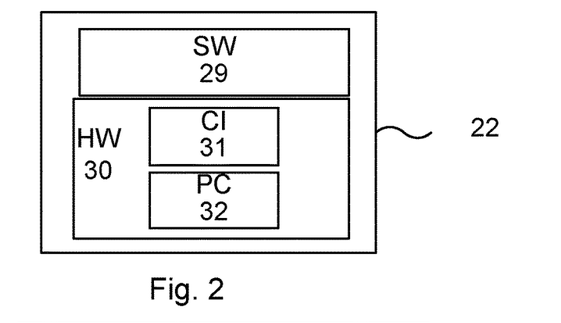
FIG. 2 shows a block schematic of a first way of realizing an access regulating device in the communication network.

FIG. 2 shows a block schematic of a first way of realizing the access regulating device 22. It may be provided in the form of software 29 operating on hardware 30. The hardware 30 includes a communication interface 31 configured to set up and maintain a wired or wireless connection with an interface of a different communication device inside and outside of the communication system 12. The hardware 30 further comprises processing circuitry 32, which may have storage and/or processing capabilities. In particular, processing circuitry 32 may comprise one or more programmable processors, application-specific integrated circuits (ASICs), field programmable gate arrays (FPGAs) or combinations of these (not shown) adapted to execute instructions. The software 29, which may be stored in a memory of the hardware 30, may also comprise an access regulating function.

Figure 3:
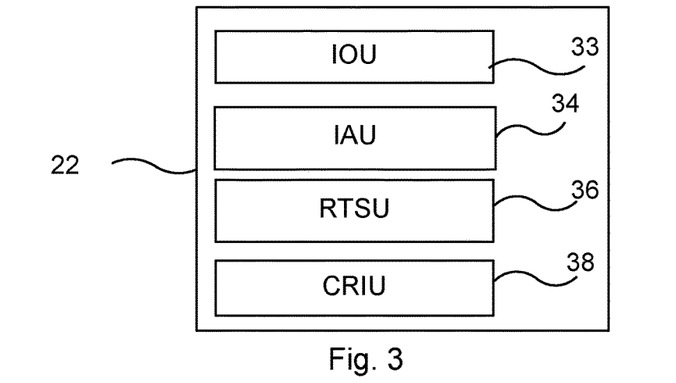
FIG. 3 shows a block schematic of a second way of realizing the access regulating device.

FIG. 3 shows a block schematic of a second way of realizing the access regulating device 22. The access regulating device 22 may comprise an indication obtaining unit IOU 33, an indication analysing unit IAU 34, a restriction type selecting unit RTSU 36 and a communication restriction informing unit CRIU 38.

Figure 4:
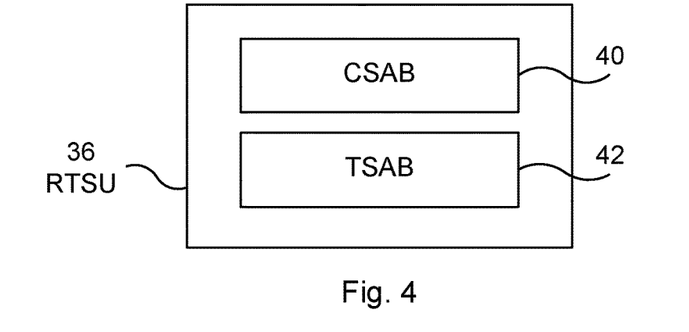
FIG. 4 shows a block schematic of one realization of a communication type restriction selecting unit in the second realization of the access regulating device.

FIG. 4 shows a block schematic of the restriction type selecting unit RTSU 36. It comprises a confidence setting analysing block CSAB 40 and a time stamp analysing block TSAB 42.

As is indicated above, the above mentioned units and blocks may be realized as software as well as hardware and may also realize the access regulation function.

A communication terminal 10 may communicate with the application server 26 in order to perform some kind of function. It may for instance report data or measurements. However, it is also possible that it may become compromised, for instance through being hacked. If this is the case, the communication terminal 10 may act differently from the way it is supposed to. The communication terminal 10 may for instance have a certain type of nominal communication pattern and it may be deemed to be compromised if this pattern is radically changed. It may thus get an irregular behaviour. It is possible that such a determination that the communication terminal 10 is compromised is being made by the application server 26.

A compromised communication terminal may send data that is unwanted and sometimes also dangerous. Also such data may unnecessarily occupy resources in the communication network 10 that are better used for other type of traffic that is of actual benefit to the end user. It may also congest the communication network to such a degree that other types of communication is blocked or limited.

If the communication terminal is an M2M device in the form of a smart meter it may as an example be configured to send small amounts of data (~100 bytes) 2 times a day to a Headend system (AS) for instance using 3GPP UE based Universal Subscriber Identity Module (USIM) communication.

If the smart meter device is compromised on security and is sending frequent data e.g. every 10 minutes, and large chunk of data (few KBs/MBs), then it may be possible for the Application Server (3rd party AS) to conclude that it is hacked and might be further exploited to congest the network and respective Application Server supported Application.

It is therefore of interest to handle or regulate the access of a potentially compromised communication terminal in the communication network.

Various embodiments are directed towards such access regulation for a potentially compromised communication terminal.

Figure 5:
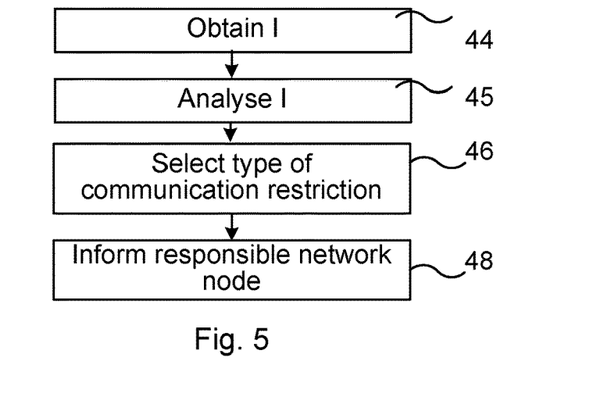
FIG. 5 shows a flow chart of method steps in a method for regulating access of the communication terminal to the communication network according to a first embodiment.

Now a first embodiment will be described with reference being made also to FIG. 5, which shows a flow chart of method steps in a method for regulating access of the communication terminal 10 to the communication network 12 and being performed in the access regulating device 22.

The method starts by the communication interface 31 of the access regulating device 22 obtaining an indication I that the communication terminal 10 is a potentially compromised communication terminal, step 44. Such an indication may as an example be obtained through the application server 26 sending it. Alternatively the access regulating functionality of the access regulating device 22 may regularly poll the application server 26 for such an indication I. The indication may comprise a confidence setting or probability of compromise and possibly also an indication, for instance in the form of a time stamp, indicating for how long the communication device has been deemed possibly compromised.

Thereafter the access regulating functionality of the access regulating device 22 analyses the indication I, step 45, and then selects type of communication restriction based on the analysis, step 46. The analysis may involve analysing the confidence setting and if a time stamp is present also the time stamp. If only a confidence setting is present, it may be compared with at least one and possibly two confidence setting thresholds, where if the confidence setting exceeds a first upper confidence threshold, then a first type of communication restriction is selected, while if the confidences setting is below the first upper confidence threshold and possibly also above a second lower confidence threshold then a second type of communication threshold may be selected. In this case it is also possible that no communication restriction is selected if the confidence setting is below the second lower confidence threshold. Another possible variation is that only the first upper confidence setting threshold is used. In this case a communication restriction may always be selected based on the obtained indication, either the first type of communication restriction if the threshold is exceeded and otherwise the second type of communication restriction.

In case a time stamp is used, then the first confidence threshold may be used to select between the application of a communication restriction and no activity, while the age of the time stamp may be used to select between the first and second type of communication restrictions.

The first type of communication restriction may comprise barring the communication terminal 10 from using the communication network 12, while the second type of communication restriction may comprise limiting the use of the communication network 12 by the communication terminal 10. A limited use may involve limiting the use to a low priority carrier and/or to a low bandwidth.

After the access regulating function of the access regulating device 22 has selected type of restriction, it then informs at least one network node responsible for handling communication restrictions of the type selected for the communication terminal 10, in order for the communication network 12 to effectuate the communication restriction, step 48. It thus informs at least one node that is responsible for effectuating communication restrictions of the selected type.

A barring may for instance involve an administrative setting being made by the rights administration node 18. It may additionally or alternatively involve sending an instruction to a node that regulates traffic in the communication network 10. The access regulating device 22 may for this reason inform the rights administration node 18 of the barring, through sending a first barring signal B1 that is a blacklisting signal to the rights administration node 18. It may as another example inform the traffic handling node 16 through sending a second barring signal B2 that is a blocking request to the traffic handling node 16, which may in turn send a third barring signal B3 in the form of a blocking request to the base station 14.

A limiting of use may in turn involve sending a request Q to quarantine the communication terminal 10 to the policy rules setting node 24.

Once a restriction handling node has received the instruction, it then effectuates the communication restriction. In the case of the rights administration node 18, it may set the communication terminal 10 as being barred and thereby the communication terminal 10 is disallowed to use the communication network 12 and communication attempts from outside of the communication network 12 towards the communication terminal 10 denied. In the case of the traffic handling node 16, it may instruct the base station 16 to order the communication terminal 10 to disconnect from the communication network 12 and to block any connection request issued by the communication terminal 10. In the case of the policy rules setting node 24, it may set the communication terminal 10 to use a low priority carrier and/or a low bandwidth, which means that when the communication terminal 10 wants to access the communication network 12, it will be assigned a low priority carrier and/or a low bandwidth. Thereby other communication terminals will be handled first and when the communication terminal 10 is allowed to use the communication network 12, then the bandwidth is limited.

It can be seen that any untoward pattern may then be preempted and an early detection of the same by respective Application Server (3rd Party). Application Server will then intimate the same to the access regulating device 22, which will interact with core network nodes to decommission the communication terminal from the communication network 10 so that signaling and traffic plane overload is prevented.

This solution will have a rigorous advantage wherein the 3rd party Application Server upon detection of any unpredicted pattern in the M2M communication used by the application, will convey the same to the access regulating device. In turn, the access regulation will ensure that the expensive signaling and traffic load choking the core network is prevented.

Figure 6:
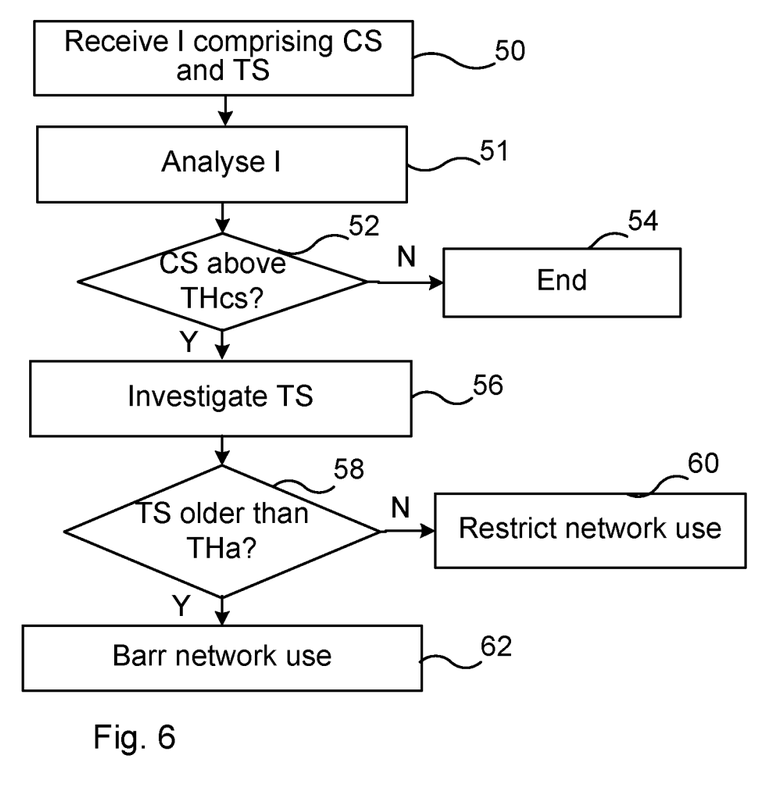
FIG. 6 shows a flow chart of method steps in a method for regulating access of the communication terminal to the communication network according to a second embodiment.
Figure 7:
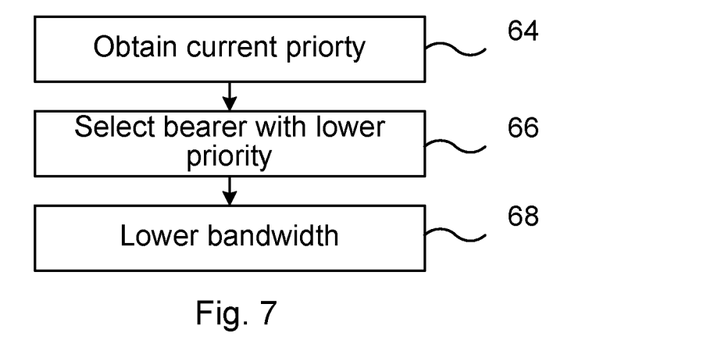
FIG. 7 shows a flow chart of method steps for the selecting and setting of a type of communication restriction for the communication terminal, FIG. 8 show signals exchanged between the application server, the access regulating device and various other nodes of the communication network in order to regulate the access of the communication terminal to the communication network.
Figure 8:
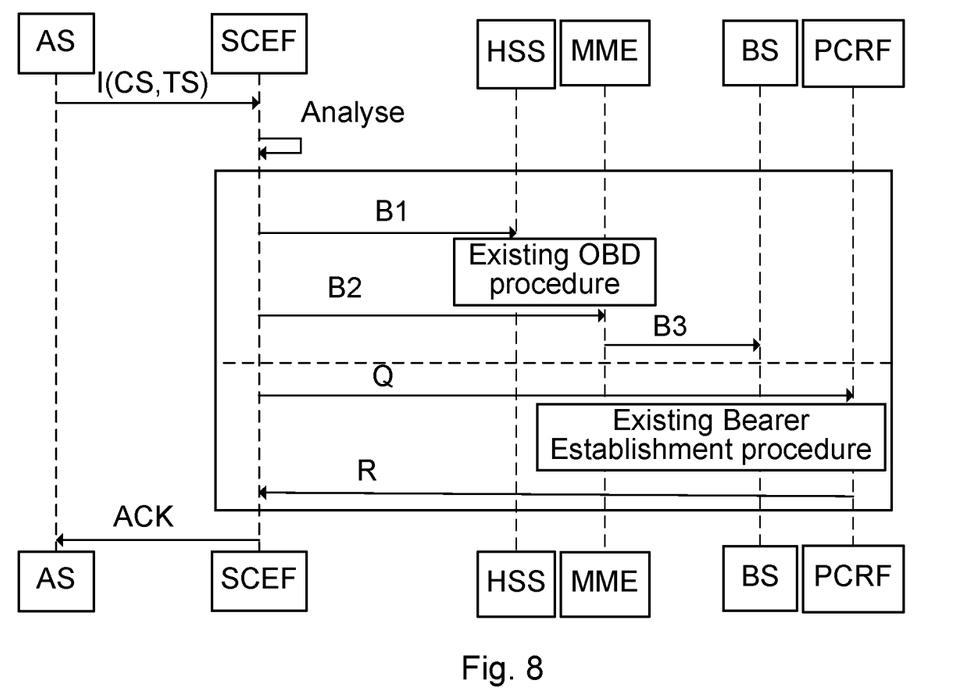

A second embodiment will now be described with reference being made to 6, 7 and 8, where FIG. 6 shows a flow chart of method steps in a method for regulating access of the communication terminal to the communication network, FIG. 7 shows a flow chart of method steps for the selecting and setting of a type of communication restriction for the communication terminal and FIG. 8 show signals exchanged between the application server, the access regulating device, the HSS, MME, base station and PCRF node in order to regulate the access of the communication terminal to the communication network.

As can be seen in FIG. 8, the application server 26 sends an indication I to the access regulating device 22, which indication comprises a confidence setting CS and a time stamp TS.

The method therefore starts by the communication interface 31 of the access regulating device 22 receiving, from the application server 26, the indication I that the communication terminal 10 is a potentially compromised communication terminal, step 50. As stated above, the indication I comprises the confidence setting CS and a time stamp TS indicating for how long the application server 26 has deemed the communication terminal 10 to be possibly compromised. The time stamp TS may thus reflect the point in time at which the communication terminal 10 was found to be potentially compromised by the application server 26.

The finding of the communication device 10 being potentially compromised could involve pattern analysis of uplink traffic (i.e. from the communication terminal 10 to the communication network) in terms of throughput variations, deep packet inspection etc. It is important to note that the application server function may be logical and physically placed in any node in the communication network. In the case of a mobile communication network and a UE, the application server functionality may be provided on the UE itself, the eNodeB, a core network node such as MME, or it can be a standalone node in the core network or an external cloud service (e.g. as part of an automated network management solution). The AS function may determine the communication terminal to be compromised with some degree of confidence: for example, there may be an 80% chance that the communication terminal 10 is compromised For a mobile communication network and a UE, the message I may as an example be encapsulated in the body of a Hypertext Transfer Protocol (HTTP) POST request in a format such as the Javascript Object Notation (JSON) format shown below:

```
{
    "UEID":082903543002178174,
    "Confidence":0.85,
    "Time":1499857148
}
```

The message may thus contain an indication of which UE is compromised. The identity of the UE is the value of the UEID key (as in UE identity), and the value of the key is in this case the International Mobile Subscriber Identity (IMSI) of the UE. Depending on where the AS 26 is implemented, there can be alternatives to using IMSI as UE ID, for example the assigned IP address of the UE or the Media Access Control (MAC) address of the UE's radio module. If the application server is implemented as a cloud service, it might be more likely to use IP address as an identifier. In another example, if AS is part of the UE, then it may also not use IMSI (because its not secure to transfer IMSI over an air interface due to risk of eavesdropping devices such as IMSI catchers) and it may instead prefer to use a MAC address. Alternatively, if AS is part of the core network, e.g. function in the MME node, then it can use IMSI.

The message may also contain a confidence key. Its value is an indication of how certain AS is about a specific UE being compromised. In the above example, this value is normalized between 0 and 1, the latter indicating absolute certainty.

Finally, the message includes a timestamp indicating the exact time and date of determination of a potential compromise. The example uses a compact UNIX timestamp, which is the total number of seconds since Unix Epoch (Jan. 1, 1970). The number 1499857148 would therefore translate to 12Jul. 2017, 10:59:08 am UTC. Obviously the UNIX timestamp is non-limiting and other, more self-explanatory formats may also be used.

When it has received the indication I, the access regulating functionality of the access regulating device 22 analyses the indication I, step 51, and thereafter selects type of communication restriction based on the analysis.

The analysis in this case involves analysing the confidence setting CS with regard to a single confidence setting threshold THcs. In case the confidence setting CS is below the confidence setting threshold THcs, step 52, then no communication restriction is being made. In this case the access regulating function thus deems the communication to be non-compromised. However, if the confidence setting CS is above the confidence setting threshold THcs, i.e. exceeds the threshold THcs, step 52, then a communication restriction is to be made.

After having determined that a communication restriction is to be made, the access regulating functionality of the access regulating device 22 selects type of communication restriction. This involves the access regulating device 22 comparing the time stamp TS with an age threshold THa.

The determination of a potential compromise more particularly involves investigating the time of determining a potential compromise, step 56, which is reflected in the time stamp TS. The first type of restriction is then selected, step 62, if the time of determination of the compromise, which may coincide with the generation of the indication I, is older than the age threshold THa, step 58, while the second type of restriction is selected, step 60, if the time of determination is younger than the age threshold THa, step 58. Again the first type of restriction is a barring or blacklisting of the communication terminal 10 and the second is a restriction or limiting of the use of the communication network 10 or quarantining. The second type of restriction thus allows a limited use of the communication network.

Given the indication I, the access regulating device 22 thus makes a decision on whether to blacklist or quarantine the communication terminal 10. The decision may be based on policy rules. These rules can either be contained within the access regulating device itself, or can be part of another node, e.g. the policy rules setting node 24, and may apply to all communication terminals connected to the communication network, a group of communication terminals connected to the communication network or a particular communication terminal connected to the communication network. To determine which rule applies to which communication terminal or group of communication terminals, the access regulating device 22 may maintain a database of mappings between rules and communication terminals. For the example of a mobile communication network and a UE, a sample rule <UEID, RuleID> may contain multiple criteria, where one example may be:

IF Confidence is greater than 0.8 AND
    Time is less than 10 minutes ago
        Quarantine UE
    Time is more than 10 minutes ago
        Blacklist UE
ELSE Do not do anything, confidence too low.

Note that it is possible for the access regulating device 22 to revise its decision based on new evidence from the application server 26, e.g. move from a previously used quarantine process to a UE blacklist process and vice versa. It should also be noted that both the indication I being sent from the application server 26 to the access regulating device 22 and the decision rule include sample criteria. There can be more criteria involved for example:

The history of the UE (i.e. how many times in the past the UE has been quarantined or blacklisted).

The duration the UE has been compromised, from the moment of initial detection

The type of compromise, for example the UE can send erratically data in different periods than what it was supposed to and/or larger amounts of data. In another example, the UE is not sending the expected data. A typical instance of this is a temperature sensor monitoring a forest. The sensor may send values that are out of range, e.g. −200 degrees Celsius or other type of data such as Secure Shell Service Requests or Denial-of-Service (DoS) attacks. It can thus be seen that the determining of the communication restriction may be based on previous determinations of communication restrictions as well as the duration and type of irregular behaviour of the communication terminal.

When the type of communication restriction has been decided in the above mentioned fashion, the access regulating device then informs the network nodes responsible for the different activities.

In the example of a mobile communication network and a UE with the access regulating device comprising an SCEF, this means that in the case of a barring or blacklisting, this may involve the SCEF sending information to HSS to black list the UE Client. The SCEF to HSS communication may then take place over the S6t interface with the first barring signal B1 being a modified Diameter Configuration-Information Request message. The use of Diameter commands is described in more detail in 3GPP TS 29.336. The message may be modified through comprising a new attribute value pair (AVP), representing a configuration parameter to block a given UE. HSS on receipt of this configuration parameter can employ existing Operator Determined Barring (ODB) procedure to bar UE and clear existing context (if any).

The access regulating device 22 may also send barring information to the base station or eNodeB via existing UE MME to enable eNodeB to stop processing messages from UE on radio interface (e.g. Uu, or UMTS air interface). In this case, the T6a interface and MME to eNodeB S1AP interface may be used. The second barring signal B2 may then be implemented as a new diameter command code named Detach Request between SCEF and MME over the T6a interface and the third barring signal B3 may be implemented as new message named Detach Request on the S1AP interface between MME and UE. This may be sent using the RX protocol as defined in section 5 of 3GPP TS 29.214. The purpose of this message is to enable eNodeB to block UE at radio side itself for a configurable time.

In this embodiment, as an example the Configuration Information Request (CIR) command, indicated by the Command-Code field set to 8388718 and the "R" bit set in the Command Flags field, is sent from the SCEF to the HSS.

```
Message Format:
< Configuration-Information-Request > ::= < Diameter Header: 8388718,
REQ, PXY, 16777345 >
< Session-Id >
[ DRMP ]
{ Auth-Session-State }
{ Origin-Host }
{ Origin-Realm }
[ Destination-Host ]
{ Destination-Realm }
{ User-Identifier }
[ OC-Supported-Features ]
*[ Supported-Features ]
*[ Monitoring-Event-Configuration ]
[ CIR-Flags ]
*[ AESE-Communication-Pattern ]
[ Enhanced-Coverage-Restriction ]
[ Group-Reporting-Guard-Timer ]
*[ Proxy-Info ]
*[ Route-Record ]
*[AVP]
                                              { DetachRequest }
```

"DetachRequest" AVP is of type Grouped but optional AVP, and it shall contain the details for whether to detach the respective UE and optionally also the corresponding reason.

DetachRequest::=<AVP header: xxxxxx>

[DetachRequestFlag]

[DetachRequestReason]

DetachRequestFlag AVP shall contain the Flag to Identify whether to detach the affected UE or not. By default, this Flag will be set to "No"

The DetachRequestReason AVP may contain the reason why the detaching is requested from SCEF and this information could be used later for audit trail.

The handling of a limiting access or quarantining, may involve the access regulating device subjecting the UE into a state of quarantine, wherein UE is allocated limited bandwidth on a low-priority tunnel. If UE continues to behave unexpectedly, then a blacklisting of the UE may take place.

In this case the SCEF function may also be seen as an Application Function (AF) interfacing with the Policy and Charging Rules Function (PCRF). This may involve the access regulating device 22 obtaining a current priority of the communication terminal, step 64, which may be a current QoS class identifier (QCI) assigned by the PCRF, where QoS is an acronym for Quality of Service. The current priority is in turn associated with a first assigned or default bearer that is used by the communication terminal before the determination of the communication restriction. The access regulating device 22 thereafter selects a bearer with lower priority, step 66, which may involve selecting a QCI having a higher number. In this case, quarantining is a process where SCEF assigns a lower priority evolved packet switched system (EPS) bearer. As such, regular network traffic is preferred over traffic that originates from a potentially compromised UE. The limiting of access or use may also involve the access regulating device 22 assigning a lower bandwidth than that originally assigned to the communication terminal, step 68.

For the example of a UE in a mobile communication network, given a decision to quarantine the UE, the SCEF may initiate a request to change EPS bearer for UE, from its default bearer to a quarantine bearer. A bearer is in general a path for data packets when traversing the operator's network and the EPS bearer covers the path from the UE to the core network endpoint (Packet Gateway-PGW). A bearer can be configured with certain Quality of Service characteristics. A set of values for these characteristics is assigned an identifier, known as QoS class identifier (QCI). The table below shows the QCIs as of 3GPP TS 23.203 Rel-14:

TABLE

| QCI | Resource Type | Priority | Packet Delay Budget | Packet Error Loss Rate |
|-----|---------------|----------|---------------------|------------------------|
| 1   | GBR           | 2        | 100 ms              | $10^{-2}$              |
| 2   | GBR           | 4        | 150 ms              | $10^{-3}$              |
| 3   | GBR           | 3        | 50 ms               | $10^{-3}$              |
| 4   | GBR           | 5        | 300 ms              | $10^{-6}$              |
| 65  | GBR           | 0.7      | 75 ms               | $10^{-2}$              |
| 66  | GBR           | 2        | 100 ms              | $10^{-2}$              |
| 75  | GBR           | 2.5      | 50 ms               | $10^{-2}$              |
| 5   | non-GBR       | 1        | 100 ms              | $10^{-6}$              |
| 6   | non-GBR       | 6        | 300 ms              | $10^{-6}$              |
| 7   | non-GBR       | 7        | 100 ms              | $10^{-3}$              |
| 8   | non-GBR       | 8        | 300 ms              | $10^{-6}$              |
| 9   | non-GBR       | 9        | 300 ms              | $10^{-6}$              |
| 69  | non-GBR       | 0.5      | 60 ms               | $10^{-6}$              |
| 70  | non-GBR       | 5.5      | 200 ms              | $10^{-6}$              |
| 79  | non-GBR       | 6.5      | 50 ms               | $10^{-2}$              |

"GBR" stands for guaranteed bit-rate. All QCIs with GBR can provide a minimum bit-rate guarantee (e.g. 10 Kbps) to the data flowing through it. The packet delay budget is a maximum delay boundary for data from the UE to the PGW. Finally packets in QCI classes of higher priority are transferred before packets in QCI classes of lower priority. Higher priority is signified by lower priority number, e.g. QCI 69 has the lowest priority of all QCIs in the table above.

A distinction has here been made between two bearers:

Default bearer is the bearer that is assigned by the mobile network operator to a specific UE by default (i.e. on UE attach). As an example this can be any QCI other than QCI 9.

Quarantine bearer is the bearer that SCEF 22 transitions a "compromised UE" to, after it determines that the UE must be quarantined. This may be any QCI that has lower priority than the default bearer.

For example, if the default bearer is QCI 6, then quarantine bearer can be any of QCI 7, 8, 9 or 79. This will guarantee that traffic from compromised UEs will always get downprioritized in relation to the traffic of other UEs.

The message that SCEF sends to PCRF node uses Diameter protocol and Rx Interface. Specifically, the request may be an Rx AA-Request (AAR), which includes a Media-Component-Description AVP:

```
'Media-Component-Description': [
    'AF-Application-Identifier':'quarantine'
    'Media-Component-Number':1,
    '3GPP-Media-Sub-Component': [
        [
            '3GPP-Flow-Number':1,
            '3GPP-Flow-Status':'ENABLED',
            '3GPP-Flow-Description':'permit out ip from 10.2.140.12 2002 to 10.2.1.115858',
            '3GPP-Flow-Description':'permit in ip from 10.2.1.115858 to 10.2.140.12 2002',
            'Flow-Usage': 'NO_INFORMATION'
        ],
    'Media-Type': 'DATA'
]
```

In the example above, the PCRF is already configured to recognize quarantine application identifier as a QCI based on the aforementioned rule.

In the example given above quarantining was exemplified by the use of the QoS parameters QCI class and GBR. It should be known that it is possible to also the use the QoS parameter ARP (Allocation-Retention Policy) Identifier:

ARP is a variable indicating priority, when a new bearer needs to be setup with a new QoS, a low arp value means that the network can reject the request and a high ARP value means to accept it. By default, all requests are accepted, as ARP only works when the communication network has insufficient resources. One of the most representative examples of using the ARP is an emergency VoIP call. So, an existing EPS bearer can be removed if a new one is required for a emergency 119 (911 in US, 112 in EC, etc) VoIP call.

In one approach, quarantining could always be done with a high ARP value (as it essentially frees up resources), while the other way around could have a lower priority ARP as to not disturb the network operation. It could be that if the request to remove a UE from quarantine is denied, then another attempt is again made after some time.

In another approach, removal of a UE from quarantine could be done with high ARP value, e.g. to compensate for a false positive type of situation (where a UE was "suspicious" of bad behaviour but not found "guilty").

A couple of typical PCC rules can be:

"Quarantine"—QCI 5—UL 0.1 Kbps—DL 0.01 Kbps—ARP 1

"Normal"—QCI 1—UL 88 Kbps—DL 88 Kbps—ARP 10

It can thus be seen that two types of communication restriction may be implemented and used based on the indication I.

When the process ends, the AS is notified about the result from SCEF regarding the measures taken to counter the compromised UE threat.

This may be done using an acknowledgment ACK of the reception of the indication I. The result can either determine a blacklisted UE, or it can contain a warning that the UE has been quarantined. The AS can then decide the proper course of action to take towards the UE.

If for example the AS is contained on the UE itself, it might issue a warning to its user that the UE has been blocked or it has been quarantined, the user than taking corrective action (e.g. running an anti-virus programme). In an alternative example, if the communication device is not an end device, but a gateway where multiple sensors with low-power short-range radio are connected, the gateway may run diagnostics to investigate which of the sensor(s) connected via this gateway is compromised and block the sensor(s).

Figure 9:
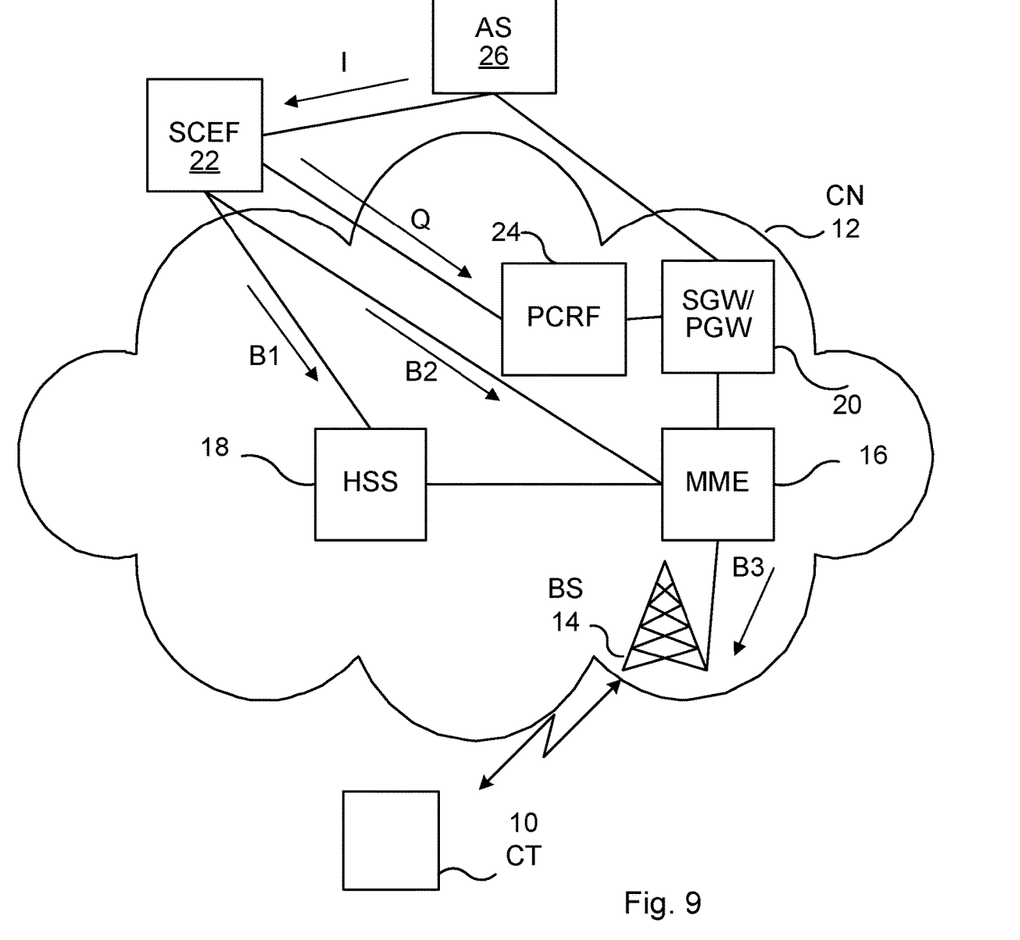
FIG. 9 shows the communication terminal, application server and the communication network for an access regulating device implemented outside of the communication network.

As is mentioned earlier, the access regulating device may be provided outside of the mobile communication network, for instance as a cloud service (e.g. as part of an automated network management solution) for the network nodes. When it is provided din the cloud it may be realized through least a part of a server in a data centre.

FIG. 9 schematically shows such a realization, where both the application server 10 and the access regulating device 22 are provided outside of the communication network CN 12. The rest of the nodes are the same as in FIG. 1, which thus also in this case is a telecommunication network. The access regulating device 22 may here be implemented as a cloud service where the network nodes push data or from where the network nodes are interrogated for data.

Figure 10:
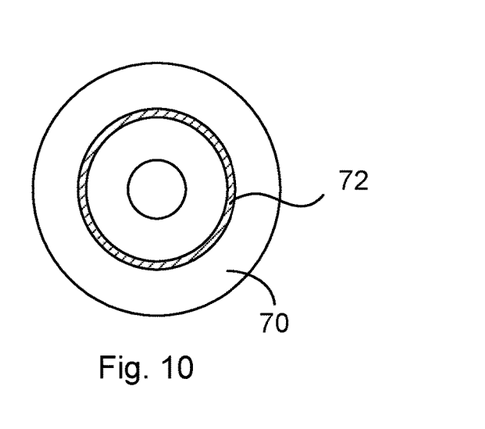
FIG. 10 shows a computer program product comprising a data carrier with computer program code for implementing the functionality of the access regulating device.

The computer program code of the access regulating device may be in the form of computer program product for instance in the form of a data carrier, such as a CD ROM disc or a memory stick. In this case the data carrier carries a computer program with the computer program code, which will implement the functionality of the above-described behaviour investigating device. One such data carrier 70 with computer program code 72 is schematically shown in FIG. 10.

The access regulating device may be considered as comprising means for obtaining an indication that the communication terminal is a potentially compromised communication terminal, which means may realized through the indication obtaining unit 33, means for analysing the indication, which means may be realized through the indication analysing unit 34, means for selecting type of communication restriction based on the analysis, where the means may be realized through the restriction type selecting unit 36, and means for informing at least one network node 16, 18; 24 responsible for handling communication restrictions of the type selected for the communication terminal 10 in order for the communication network 12 to effectuate the communication restriction, which means for informing may be realized through the communication restriction informing unit 38.

When the indication comprises a confidence setting, the means for selecting a type of communication restriction may comprise means for selecting a communication restriction if the confidence setting exceeds a confidence threshold, which may be implemented through the communication setting analysing block 40.

When the indication comprises an indication of a time of determining that the communication terminal is potentially compromised, the means for selecting a type of communication restriction may comprise means for investigating the time of this determining, which means for investigating the time of the determining may be realized through the time stamp analysing block 42.

The access regulating device may also comprise means for obtaining a further indication of a potential compromise and means for performing a re-evaluation of the determined restriction based on the further indication.

The application server 26 in FIGS. 1 and/or 9 may be a host computer, which may be embodied in the hardware and/or software of a standalone server, a cloud-implemented server, a distributed server or as processing resources in a server farm. Host computer may be under the ownership or control of a service provider, or may be operated by the service provider or on behalf of the service provider. Connections between the communication network 12 and host computer 26 may extend directly from the core network to the host computer 26 or may go via an optional intermediate network. Intermediate network may be one of, or a combination of more than one of, a public, private or hosted network; intermediate network, if any, may be a backbone network or the Internet; in particular, intermediate network may comprise two or more sub-networks (not shown).

The communication system of FIG. 1, which comprises the application server 26, the communication terminal 10 and communication network 12, as a whole enables connectivity between the connection terminal 10 and host computer 26. The connectivity may be described as an over-the-top (OTT) connection. Host computer 26 and the connected communication terminal are configured to communicate data and/or signaling via OTT connection, using access network, core network, any intermediate network and possible further infrastructure (not shown) as intermediaries. OTT connection may be transparent in the sense that the participating communication devices through which OTT connection passes are unaware of routing of uplink and downlink communications. For example, base station 14 may not or need not be informed about the past routing of an incoming downlink communication with data originating from host computer 26 to be forwarded (e.g., handed over) to a connected communication terminal 10. Similarly, base station 14 need not be aware of the future routing of an outgoing uplink communication originating from the communication terminal towards the host computer 26.

Figure 11:
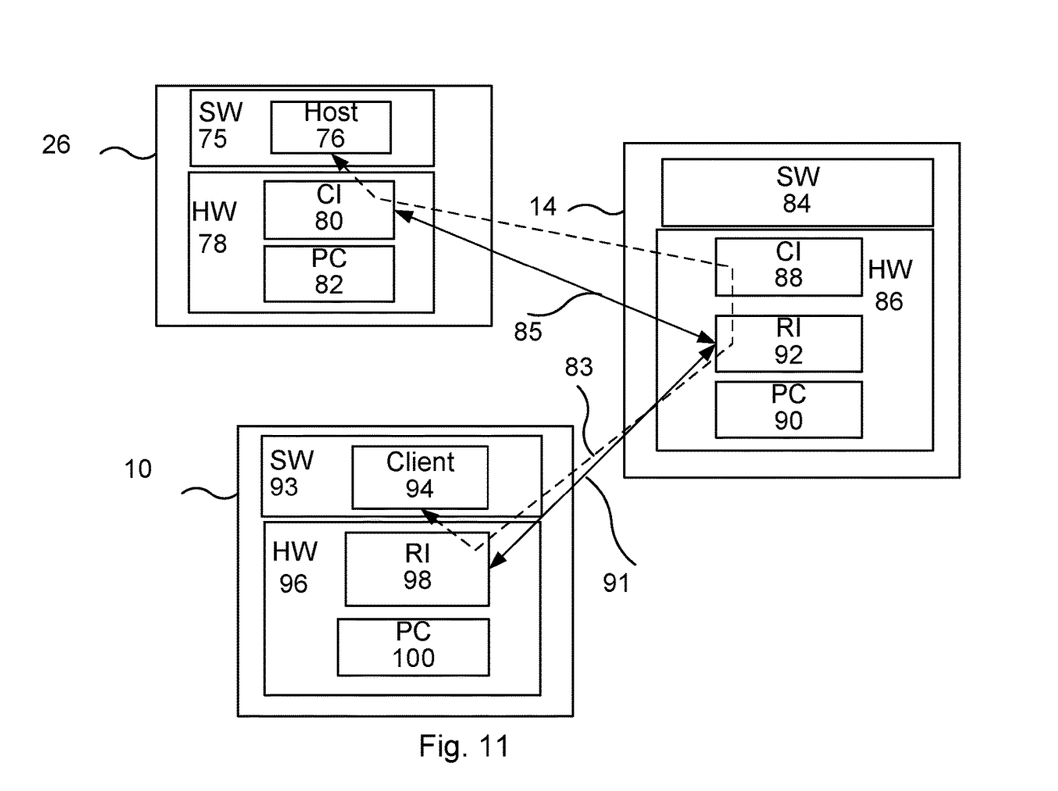
FIG. 11 shows a block schematic of a host computer communicating with a communication terminal via node in the communication network.

FIG. 11 is a schematic diagram illustrating host computer 26 communicating via a base station 14 with the communication terminal over a partially wireless connection in accordance with some embodiments. Example implementations, in accordance with an embodiment, of the communication terminal 10, base station 14 and host computer 26 discussed in the preceding paragraphs will now be described with reference to FIG. 11. In communication system, host computer 26 comprises hardware 78 including communication interface 80 configured to set up and maintain a wired or wireless connection with an interface of a different communication device of communication system. Host computer 26 further comprises processing circuitry 82, which may have storage and/or processing capabilities. In particular, processing circuitry 82 may comprise one or more programmable processors, application-specific integrated circuits, field programmable gate arrays or combinations of these (not shown) adapted to execute instructions. Host computer 26 further comprises software 75, which is stored in or accessible by host computer 26 and executable by processing circuitry 82. Software 75 includes host application 76. Host application 75 may be operable to provide a service to a remote user, such as communication terminal 10 connecting via OTT connection 83 terminating at communication terminal and host computer 26. In providing the service to the remote user, host application 76 may provide user data which is transmitted using OTT connection 83.

Communication system further includes base station 14 provided in a telecommunication system 12 and comprising hardware 86 enabling it to communicate with host computer 26 and with communication terminal 10. Hardware 86 may include communication interface 88 for setting up and maintaining a wired or wireless connection with an interface of a different communication device of communication system, as well as radio interface 92 for setting up and maintaining at least wireless connection 91 with communication terminal 10 located in a coverage area (not shown in FIG. 11) served by base station 14. Communication interface 88 may be configured to facilitate connection 85 to host computer 76. Connection 85 may be direct or it may pass through a core network (not shown in FIG. 11) of the communication network 12 and/or through one or more intermediate networks outside the communication network 12. In the embodiment shown, hardware 86 of base station 14 further includes processing circuitry 90, which may comprise one or more programmable processors, application-specific integrated circuits, field programmable gate arrays or combinations of these (not shown) adapted to execute instructions. Base station 86 further has software 84 stored internally or accessible via an external connection.

Communication system further includes communication terminal 10 already referred to. Its hardware 96 may include radio interface 98 configured to set up and maintain wireless connection 91 with a base station 14 serving a coverage area in which communication terminal 10 is currently located. Hardware 96 of communication terminal 10 further includes processing circuitry 100, which may comprise one or more programmable processors, application-specific integrated circuits, field programmable gate arrays or combinations of these (not shown) adapted to execute instructions. Communication terminal 10 further comprises software 93, which is stored in or accessible by communication terminal 10 and executable by processing circuitry 100. Software 93 includes client application 94. Client application 94 may be operable to provide a service to a human or non-human user via communication terminal 10, with the support of host computer 26. In host computer 26, an executing host application 76 may communicate with the executing client application 94 via OTT connection 83 terminating at communication terminal 10 and host computer 26. In providing the service to the user, client application 94 may receive request data from host application 76 and provide user data in response to the request data. OTT connection 83 may transfer both the request data and the user data. Client application 94 may interact with the user to generate the user data that it provides.

It is noted that host computer 26, base station 14 and communication terminal 10 illustrated in FIG. 10 may be similar or identical to application server 26, base station 14 and communication terminal 10 of FIG. 1, respectively. This is to say, the inner workings of these entities may be as shown in FIG. 11 and independently, the surrounding network topology may be that of FIG. 1 or 9.

In FIG. 11, OTT connection 83 has been drawn abstractly to illustrate the communication between host computer 26 and communication terminal via base station 14, without explicit reference to any intermediary devices and the precise routing of messages via these devices. Network infrastructure may determine the routing, which it may be configured to hide from communication terminal 10 or from the service provider operating host computer 26, or both. While OTT connection 83 is active, the network infrastructure may further take decisions by which it dynamically changes the routing (e.g., on the basis of load balancing consideration or reconfiguration of the network).

Wireless connection 91 between communication terminal 10 and base station 14 is in accordance with the teachings of the embodiments described throughout this disclosure. One or more of the various embodiments improve the performance of OTT services provided to UE 10 using OTT connection 83, in which wireless connection 91 forms the last segment. A measurement procedure may be provided for the purpose of monitoring data rate, latency and other factors on which the one or more embodiments improve. There may further be an optional network functionality for reconfiguring OTT connection 83 between host computer 26 and communication terminal 10, in response to variations in the measurement results. The measurement procedure and/or the network functionality for reconfiguring OTT connection 83 may be implemented in software 75 and hardware 78 of host computer 26 or in software 93 and hardware 96 of communication terminal 10, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software 75, 93 may compute or estimate the monitored quantities. The reconfiguring of OTT connection 83 may include message format, retransmission settings, preferred routing etc.; the reconfiguring need not affect base station 14, and it may be unknown or imperceptible to base station 14. Such procedures and functionalities may be known and practiced in the art. In certain embodiments, measurements may involve proprietary communication terminal 10 signaling facilitating host computer 26's measurements of throughput, propagation times, latency and the like. The measurements may be implemented in that software 75 and 93 causes messages to be transmitted, in particular empty or 'dummy' messages, using OTT connection 83 while it monitors propagation times, errors etc.

Figure 12:
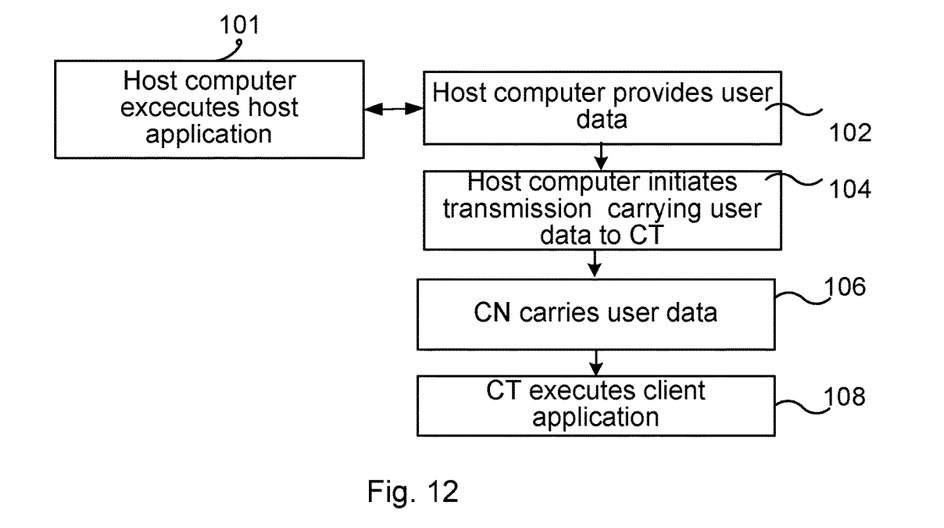
FIG. 12 shows a flow chart of a number of method steps performed by the host computer.

FIG. 12 is a flowchart illustrating a method implemented in a communication system, in accordance with one embodiment. The communication system includes a host computer, a base station and a communication terminal which may be those described with reference to FIGS. 1 and 11. For simplicity of the present disclosure, only drawing references to FIG. 12 will be included in this section. In a first step 102 of the method, the host computer provides user data. In an optional substep 101 of the first step 101, the host computer provides the user data by executing a host application. In a second step 104, the host computer initiates a transmission carrying the user data to the communication terminal. In an optional third step 106, the communication network transmits to the UE the user data which was carried in the transmission that the host computer initiated, in accordance with the teachings of the embodiments described throughout this disclosure. In an optional fourth step 108, the communication terminal executes a client application associated with the host application executed by the host computer.

In some of the embodiments described above the access regulating device was a node in the core network of a 4G or LTE mobile communication network providing a Services Capabilities Exposure Function. In a 5G network it would be a corresponding core network node providing a corresponding function, such as a Network Exposure Function (NEF).

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. An access regulating device for a communication terminal using a communication network, the access regulating device comprising processing circuitry configured to:
   obtain an indication that the communication terminal is a potentially compromised communication terminal;
   analyse the obtained indication;
   select a type of communication restriction based on the analysis, where a first type of communication restriction comprises barring the communication terminal from using the communication network and a second type of communication restriction comprises limiting the use of the communication network by the communication terminal; and
   inform at least one network node responsible for handling communication restrictions of the type selected for the communication terminal in order for the communication network to effectuate the communication restriction;
   wherein the indication comprises a confidence setting, the analysis comprises analysing the confidence setting, and the selecting of a type of communication restriction is performed if the confidence setting exceeds a confidence threshold.

2. The access regulating device according to claim 1, wherein the limiting of use comprises limiting the use to a low-priority tunnel.

3. The access regulating device according to claim 2, wherein the communication terminal uses a first assigned bearer before the selection of the type of communication restriction and the limiting of use comprises selecting a bearer for use by the communication terminal with lower priority than the first assigned bearer, and wherein the bearer is an evolved packet system bearer.

4. The access regulating device according to claim 1, wherein the communication terminal communicates using narrowband Internet-of-Things.

5. The access regulating device according to claim 1, wherein the communication network is a fifth generation mobile communication network the access regulating device is a network exposure function node.

6. The access regulating device according to claim 1, wherein the access regulating device is implemented through least a part of a server in a data centre.

7. The access regulating device according to claim 1, wherein the limiting of use comprises limiting a communication bandwidth assigned to the communication terminal.

8. The access regulating device according to claim 1, wherein the indication comprises a time of determining that the communication terminal is potentially compromised and the analysing comprises investigating the time of determining, where the first type of restriction is selected if the time of determining is older than an age threshold and the second type of restriction is selected if the time of determining is younger than the age threshold.

9. The access regulating device according to claim 1, wherein the selecting of type of communication restriction is based on policy rules provided for the communication terminal.

10. The access regulating device according to claim 1, wherein the selecting the type of the communication restriction is based on previous selections of communication restrictions as well as the duration and type of irregular behaviour of the communication terminal.

11. The access regulating device according to claim 1, the processing circuitry being configured to:
obtain a further indication of a potential compromise and perform a re-evaluation of the selected type of restriction based on the further indication.

12. A method for regulating access of a communication terminal to a communication network comprising at least one network node responsible for handling communication restrictions, the method being performed in an access regulating device and comprising
obtaining an indication that the communication terminal is a potentially compromised communication terminal,
analysing the obtained indication,
selecting a type of communication restriction based on the analysis, where a first type of communication restriction comprises barring the communication terminal from using the communication network and a second type of communication restriction comprises limiting the use of the communication network by the communication terminal, and informing at least one network node responsible for handling communication restrictions of the type selected for the communication terminal in order for the communication network to effectuate the communication restriction;
wherein the indication comprises a confidence setting, the analysis comprises analysing the confidence setting, and selecting the type of communication restriction is performed if the confidence setting exceeds a confidence threshold.

13. The method according to claim 12, wherein the communication terminal uses a first assigned bearer before the selection of the type of communication restriction and the limiting of use comprises selecting a bearer with lower priority than the first assigned bearer.

14. The method according to claim 12, wherein the limiting of use comprises limiting the communication bandwidth assigned to the communication terminal.

15. The method according to claim 12, wherein the indication comprises a time of determining that the communication terminal is potentially compromised and the analysing comprises investigating the time of determining, where the first type of restriction is selected if the time of determining is older than an age threshold and the second type of restriction is selected if the time of determining is younger than the age threshold.

16. The method according to claim 12, wherein the determining of the communication restriction is based on previous determinations of communication restrictions as well as the duration and type of irregular behaviour of the communication terminal.

17. The method according to claim 12, further comprising: obtaining a further indication of a potential compromise and performing a re-evaluation of the determined restriction based on the further indication.

18. A communication system including a host computer comprising:
processing circuitry configured to provide user data; and
a communication interface configured to forward the user data to a communication network for transmission to a communication terminal,
wherein the communication network comprises at least one node responsible for handling communication restrictions and an access regulating device having processing circuitry configured to:
obtain an indication that the communication terminal is a potentially compromised communication terminal,
analyse the obtained indication,
select a type of communication restriction based on the analysis, where a first type of communication restriction comprises barring the communication terminal from using the communication network and a second type of communication restriction comprises limiting the use of the communication network by the communication terminal, and
inform at least one network node responsible for handling communication restrictions of the type selected for the communication terminal in order for the communication network to effectuate the communication restriction;
wherein the indication comprises a confidence setting, analyzing the obtained indication comprises analysing the confidence setting, and selecting the type of communication restriction is performed if the confidence setting exceeds a confidence threshold.

* * * * *